Patented Dec. 26, 1950

2,535,678

UNITED STATES PATENT OFFICE 2,535,678

METHOD FOR THE PREPARATION OF ETHERS OF HYDROXYETHANE SULFONATES AND ETHER ALCOHOLS

Charles S. Hollander, Philadelphia, and Louis H. Bock, Huntingdon Valley, Pa., assignors to Rohm & Haas Company, Philadelphia, Pa., a corporation of Delaware No Drawing. Application February 15, 1947, Serial No. 728,958

4 Claims. (Cl. 260—512)

This invention deals with a method for forming ethyl sulfonate ethers of high-boiling hydroxyl compounds. More particularly, it concerns an improved process for converting compounds of the formula ROH to ether sulfonates of the formula $ROC_2H_4SO_3M$, where M is an alkali metal and R is an organic group, particularly a hydrocarbon group of at least six carbon atoms and desirably at least eight carbon atoms up to eighteen carbon atoms.

The methods utilized heretofore for the preparation of ethyl sulfonate ethers have been based on etherification under the conventional condition of the presence of a strong acid, or by the reaction of an alkali alcoholate and a haloethane sulfonate in accordance with the principles of the Williamson reaction, or by replacement of a halogen with a sulfite or bisulfite. All of these methods contaminate the product with acid or a salt which is not readily separated from the sulfonated ether itself. These methods have suffered from other disadvantages such as, for example, the difficulties of preparing ether halides, alkoxides, or halo- or hydroxyethane sulfonic acid. Ether halides are not readily obtained, and their reaction with bisulfites or sulfites requires pressure apparatus. Sodium or other alkali metal alkoxide requires the use of alkali metals, a hazardous and expensive procedure. Hydroxyethane sulfonic acid and chloroethane sulfonic acid, in addition to the complexities of their preparation, are very corrosive at the temperatures required for their use. A method of avoiding these disadvantages has long been desired and is provided by the process herein disclosed and claimed.

According to this invention, compounds of the formula ROH which boil above about 155° C. at normal pressures, in which the hydroxyl group provides the sole reactive hydrogen and in which the group —OH is bound to a carbon atom which, in turn, is linked to carbon and hydrogen with not more than two carbon atoms being bound to the hydroxyl-bearing carbon atom, are reacted at 155° to 260° C. with an alkali metal hydroxyethane sulfonate in the presence of an alkali metal hydroxide as a catalyst with removal of water formed during the reaction.

The compound ROH may be aliphatic, cycloaliphatic, aryl-aliphatic, aryl, or heterocyclic, provided it fulfils the above requirements. An important class of these compounds comprises compounds in which R is a hydrocarbon group, as found in primary and secondary alcohols and in hydroxylated benzene and its homologues and the series of hydroxylated, alkylated benzene derivatives. Tertiary alcohols generally are dehydrated at the temperatures used for the reaction and are, therefore, undesirable as reactants. Another important subclass of compounds comprises ether alcohols in which R represents the group $R''(OR')_x$—, where R' is an alkylene chain of two to three carbon atoms, R'' is a hydrocarbon group, and $x$ is an integer from one to twenty or more.

When R is a hydrocarbon group, it represents the residue from such hydroxylated compounds as octyl, capryl, nonyl, decyl, undecyl, dodecyl, myristyl, cetyl, or octadecyl alcohols, 2-isopropyl-3,3-dimethylbutyl, 2,2,4-trimethylhexyl, 1-methyl-4-ethyloctyl, or 2-ethylhexyl alcohols, 5-ethylnonanol-2, 7-ethyl-2-methylundecanol-4, or 3,9-diethyltridecanol-6, undecenyl, or oleyl alcohols, or other straight chain or branched chain primary or secondary aliphatic alcohol, whether saturated or unsaturated, of eight to eighteen carbon atoms. R may also be the hydrocarbon residue from benzyl, methylbenzyl, butylbenzyl, tert.-amylbenzyl, isooctylbenzyl, diisobutylbenzyl, methylbutylbenzyl, phenylbenzyl, tert.-dodecylbenzyl, phenylethyl, butylphenylethyl, or other aralkyl alcohol, or the hydrocarbon residue from cyclohexyl, methylcyclohexyl, butylcyclohexyl, cyclohexylcyclohexyl, dicyclopentenyl, nordihydrodicyclopentenyl, terpenyl, nortetrahydrodicyclopentenyl, or other cycloaliphatic alcohol of six to eighteen carbon atoms. Furthermore, R may be the hydrocarbon residue from phenol, the various cresols, ethylphenol, o- or p-tert.-butylphenol, tert.-amylphenol, octylphenol, 1,1,3,3-tetramethylbutylphenol, cyclohexylphenol, butylphenylphenol, terpenylphenol, dodecylphenol, or other phenols having six to eighteen carbon atoms, with straight, branched, or cyclic substituent in the phenol nucleus, or from α- or β-naphthol, isopropylnaphthol, butylnaphthol, octylnaphthol, or the like, the exact position of the ring substituent not being a determining factor in the reaction which is here claimed.

The ether alcohols which may be used are any of those boiling above about 155° C. in which the ether grouping is formed with alkylene chains or alkylene chains interrupted by oxygen (R' in the formula R''(OR')OH), which ether substituents terminate in an alcoholic hydroxyl group and in a hydrocarbon group which may be aliphatic, cycloaliphatic, arylaliphatic, or aryl (R'' in the formula), and may contain up to eighteen carbon atoms. As the group R', there may be used ethylene, propylene, or trimethylene groups, or polyalkylene groups, such as —$CH_2CH_2OCH_2CH_2$—, —$CH_2(CH_3)CHOCH(CH_3)CH_2$—
—$CH_2(CH_3)CHOCH_2CH_2$—
—$CH_2CH_2CH_2OCH_2CH_2CH_2$—
—$CH_2CH_2OCH_2CH_2OCH_2CH_2$—
—$CH_2CH_2OCH_2CH_2OCH_2CH_2OCH_2CH_2$— etc., containing up to about twenty oxyalkylene units. The ether alcohols which may be reacted with an alkali hydroxyethane sulfonate may be summarized by the formula $R''(OC_nH_{2n})_xOH$, where R'' is a hydrocarbon group as herein defined, $C_nH_{2n}$ is an alkylene chain of two to three carbon atoms, $n$ having a value of two to three, and $x$ is an integer from one to twenty.

The group R'' is a hydrocarbon group of sufficient size to raise the boiling point of the resulting ether alcohol to the required reaction temperature of 155° C. or more. Thus, a butyl group is large enough to give an ether of suitable boiling point with the —$OC_2H_4OH$ group, while with the group —$OC_2H_4OC_2H_4OH$ a methyl group is all that is required. In place of methyl or butyl groups, there may be used ethyl, propyl, or isopropyl groups, or the various amyl, hexyl, heptyl, octyl, dodecyl, octadecyl, allyl, methallyl, crotyl, undecenyl, oleyl, or other aliphatic radical of one to eighteen carbon atoms, whether straight or branched, saturated or unsaturated.

Similarly, there may be used as R'' a cyclic hydrocarbon substituent, whether saturated or unsaturated, with or without a ring substituent, such as phenyl, methylphenyl, butylphenyl, diisobutylphenyl, cyclohexyl, methylcyclohexyl, nordihydrodicyclopentenyl, terpenyl, or the like carbocyclic group.

The starting hydroxylated material, ROH, need not be a pure compound and may be a mixture of chemical entities, as obtained from the hydrogenation of fatty oils to alcohols, or from a high-boiling fraction of alcohols produced catalytically from carbon monoxide and hydrogen, or from the alkylation of aromatic compounds.

The hydroxyethane sulfonate may be that of any alkali metal, but particularly the sodium or potassium salt. As is known, these sulfonates are readily obtained by the action of ethylene oxide on an acid sulfite salt, such as sodium or potassium bisulfite or metabisulfite.

To effect the reaction between the hydroxyethane sulfonate and the hydroxylated compound, ROH, the two are mixed and a small amount of an alkali hydroxide added as catalyst. Such hydroxide is desirably added in an amount from one-fortieth to one-fifth mol per mol of ROH. There may be also added a high-boiling inert solvent such as xylene, cymene, diisopropylbenzene, kerosene, or the like. The reaction mixture is then carried to 155° to 260° C. and water is removed as the reaction proceeds. Some relatively complex hydroxylated compounds are desirably carried to the upper range of these reaction temperatures. On the other hand, the use of solvents usually permits removal of water with the solvent vapors which are condensed, followed by separation of water therefrom and return of solvent to the reaction mixture. When no solvent is used, it is often advantageous to pass the vapors through a condenser which is held at about 100° C. with steam. This causes condensation and reflux of reactant but permits escape of water vapor. The reaction mixture is heated, preferably with stirring, until water is no longer separated and the reaction appears essentially complete. Since the reaction is not a rapid one, from four to sixteen hours may be required. During the reaction, it is often desirable to protect the reaction mixture with a slow stream of an inert gas, such as nitrogen, to prevent development of color.

The products obtained by this reaction are generally waxy solids which are soluble in water and in some organic solvents. The products with hydrocarbon ether groups of six or eight to eighteen carbon atoms are soap-like, giving solutions which foam; they disperse solids and act as emulsifiers and detergents. The shorter-chained products act as wetting and penetrating agents, while the very long-chained products serve as softeners for textiles. The sulfonates containing polyether groups are all characterized by considerable dispersing and deflocculating power.

The following examples are given to illustrate the practical preparation of ethyl sulfonate ethers according to the procedure of this invention:

Example 1

A mixture was prepared from 1000 parts of a fraction of higher alcohols obtained from the hydrogenation of coconut oil fatty acids, the fraction having a hydroxyl number of 280, thus corresponding to an average molecular weight of 200 and containing dodecyl alcohol as the chief constituent, 740 parts of sodium isethionate, and twenty parts of powdered sodium hydroxide. The mixture was stirred and heated at 200° C. for four hours. There was thus obtained a waxy solid, when cooled, which was completely soluble in water. This product was chiefly sodium dodecyloxyethane sulfonate.

The solutions foamed and exhibited marked capillary activity. The surface tension of a 1% solution was 27.9 dynes per centimeter, while the interfacial tension of this solution against a white mineral oil was 2.0 dynes per centimeter. The solutions had considerable dispersing action against carbon black.

In the same way as just described, there may be reacted any primary or secondary alcohol boiling above 155° C. Thus, octyl, nonyl, decyl, and dodecyl alcohols yield ethyl sulfonate ethers which show considerable wetting power. The ethers from pure octyl and octadecyl alcohols give soap-like products very much like those from the fractionated alcohols from coconut oil. They impart a soft finish to textiles.

There may be readily reacted under the same conditions described for the alcohols from hydrogenated coconut oil benzyl alcohol or alkylated benzyl alcohol. The products exhibit penetrating and wetting properties and serve as textile assistants.

Example 2

Reaction of individual alcohols takes place in the same manner as shown above for the mixed alcohols of commerce. Thus, sixty-five parts of n-octyl alcohol is mixed with seventy-four parts of sodium isethionate and two parts of powdered sodium hydroxide. The mixture is heated in a vessel equipped with a stirrer and an upright condenser through which steam is passed, permitting water vapor to escape and returning most of the octyl alcohol. The temperature is controlled by heating an oil bath at 200° to 220° C. with reflux of the alcohol. Nitrogen gas is passed into the reaction vessel. After five hours of heating, the reaction product is freely soluble in water. The excess alcohol is then stripped off. The residual product is completely water-soluble. Its solutions are definitely surface-active and provide wetting and penetrating action. The reaction product may be improved as to purity by extraction with boiling butanol, in which it is fairly soluble. When the butanol solution is cooled, micro crystals deposit. These are readily separated by centrifuging. Remaining traces of alcohol may be driven off by heating at 120°–130° C. Potassium isethionate may be used in place of the sodium salt with production of the same type of compound.

Example 3

The reaction with octadecyl alcohol is effected in much the same way as just described. Excess of the alcohol need not be used. Since the reaction can be readily carried to a high temperature, the lower reactivity of the larger hydrocarbon group can be more than offset. After about twelve hours of heating at 220° C. to 240° C., preferably under nitrogen, a water-soluble product is obtained. This is a good detergent in hot water. It imparts to textiles a soft and pleasant handle.

Example 4

A mixture was made with seventy-five parts of the secondary alcohol obtained by the acid-catalyzed addition-rearrangement product of dicyclopentadiene and water, seventy-four parts of sodium isethionate, and two parts of sodium hydroxide. This mixture was stirred and heated at 180°–190° C. for nine hours while the water of reaction was allowed to escape. The product obtained was a waxy solid which dissolved completely in water to give soapy solutions. One per cent in a 2% sodium chloride solution gives a marked lowering of surface tension, the value determined being 27.7 dynes per centimeter. The interfacial tension is 2.0 dynes per centimeter against white mineral oil.

In the same way, there may be used other cyclic alcohols, including cyclohexanol and its alkylated derivatives, terpineol, and also the acid-catalyzed, addition-rearrangement products obtained by the reaction of water and dicyclopentadiene, and the adducts of cyclopentadiene and indene, styrene, and other unsaturated hydrocarbons. The ethyl sulfonate ethers of cyclic alcohols have considerable dispersing and emulsifying power.

Example 5

A mixture was made from 620 parts of diisobutylphenol, 445 parts of sodium isethionate, and twelve parts of powdered sodium hydroxide. The mixture was stirred and heated at 200° to 215° C. for five hours. Water was permitted to escape through a steam-heated reflux condenser. There was thus obtained a hard, brittle solid, which is soluble in water. This product consisted essentially of

$C_8H_{17}C_6H_4OCH_2CH_2SO_3Na$

The solutions are highly surface-active. A 1% solution has an interfacial tension of 1.9 dynes per centimeter against white mineral oil and a tension against air of 26.8 dynes per centimeter.

The reaction is likewise effected with other phenols, including not only phenol itself and naphthol, but also other hydrocarbon-substituted phenols and naphthols to give hard, brittle solids, likewise soluble in water.

Example 6

A reaction vessel equipped with stirrer, reflux condenser connected to a steam line, and a gas inlet tube was charged with 585 parts of p - 1,1,3,3 - tetramethylbutylphenoxyethoxyethanol, 356 parts of sodium isethionate, and five parts of sodium hydroxide. The mixture was stirred and heated for two hours at 165°–175° C. and then for thirteen hours at 174°–177° C. while nitrogen was passed through the reaction vessel. The product resulting was a waxy solid. This was extracted with toluene and the resulting solution was filtered and evaporated to dryness. The product thus prepared was analyzed for ash as $Na_2SO_4$. The ash found amounted to 16.63%, corresponding well with a theoretical value for $C_{20}H_{33}NaO_6S$ of 16.85%.

The solutions of the crude or purified product were found to be very soapy. A 1% solution was prepared in a 2% sodium chloride solution. It had a surface tension of 26.2 dynes per centimeter and an interfacial tension against white mineral oil of 1.4 dynes per centimeter.

The repetition of the preparation with 500 parts of 1,1,3,3-tetramethylbutylphenoxyethoxyethanol for the 585 parts of the ether alcohol used above gave a waxy solid which gave a soapy solution in water with marked lowering of surface tension, 1% to 0.1% solutions giving values between 27 and 28 dynes per centimeter. These solutions give rapid wetting out of cotton yarn, according to the Draves sinking time test.

In place of the 1,1,3,3-tetramethylbutylphenoxyethoxyethanol used above, other alkylated phenoxyalkanols may be reacted in the same way. Butylphenoxyethanol, hexylphenoxyethanol, octylphenoxyethanol, and dodecylphenoxyethanol all yield ether sulfonates of high dispersing, penetrating, and wetting power. A similar series of compounds is obtained from alkylphenoxyethoxyethanols. With additional ether groups, as in octylphenoxypropoxypropoxypropanol or undecylphenoxyethoxyethoxyethoxyethanol, powerful detergent action is obtained as well as wetting and dispersing.

Example 7

A reaction vessel equipped with stirrer, gas inlet, and a reflux condenser having a trap for separating water was charged with 1170 parts of the product obtained by reacting diisobutylphenol and ethylene oxide until the take-up of ethylene oxide corresponded to two ethoxy groups on average, 712 parts of sodium isethionate, 500 parts of xylene, and twelve parts of sodium hydroxide. The mixture was stirred and heated to 160° C., at which temperature reflux of solvent began. Solvent was returned, and water was removed. During the course of seven hours, seventy parts of water was taken off. The temperature was carried to 178° C. During the reaction, a slow stream of nitrogen blanketed the reaction mixture. The reaction mixture was neutralized with a little phosphoric acid. The solvent was distilled off under reduced pressure to leave a waxy solid. This product was soluble in water and in hydrocarbon solvents, with only a trace of material being left in suspension. A 2% solution in naphtha was made and filtered. It was found to have considerable dispersing power toward solids such as carbon black and could be used as a detergent solution for cleaning. The aqueous solutions likewise had considerable detergent power.

By the same procedure, any of the alkylphenyl polyethoxy ethanols or alkylphenyl polypropoxy propanols may be converted to sulfonates. Instead of the compounds mentioned just above with a few ether groups, there may be used polyalkoxyalkanols with as many as twenty ether groups. These are comparatively non-volatile substances and can be reacted in the upper ranges of temperature to give anion-active compounds. These sulfonates are particularly useful surface-active compounds when the alkyl group attached to the phenyl ring contains four to twelve carbon atoms. Since the tertiary butyl, octyl, and dodecyl groups are economically provided from hydrocarbon sources, they are important substituents of the phenyl group.

The reaction is not confined to monohydroxyl-substituted compounds. There may be used glycols or other polyhydric alcohols, including soluble polymeric products obtained with formaldehyde and phenols and the alkoxyalkanols derived therefrom by reaction with alkylene oxides. Thus, the reaction with alkali isethionates may be effected with ethylene glycol, propylene glycol, diethylene glycol, triethylene glycol, tetraethylene glycol, dipropylene glycol, glycerine, methyl glycerine, mono ethers of glycerine, pentamethylene glycol, and long-chained alkylene glycols, such as octadecanediol, decanediol, and the like.

*Example 8*

A mixture of seventy-five parts of triethylene glycol, 163 parts of sodium isethionate, and two parts of powdered sodium hydroxide was stirred and heated at 180°–190° C. The reaction mixture was protected with an atmosphere of nitrogen. Water formed in the reaction was allowed to escape. After five hours, it was found that 75% of the glycol had reacted, according to hydroxyl number. Continuation of the reaction led to formation of a hard, hygroscopic solid which was completely soluble in water.

*Example 9*

In the same way, 715 parts of octadecanediol-1,12, 815 parts of sodium isethionate, and ten parts of powdered sodium hydroxide were mixed and stirred under a nitrogen atmosphere at 170°–190° C. for ten hours. The water formed was carried off in the gas stream. The product was a hard, waxy solid which dissolved in water to give a soapy solution.

*Example 10*

A mixture was made of seventy-nine parts of the polymeric condensate obtained by adding three moles of ethylene oxide per phenol nucleus to a condensate of p-($\alpha,\alpha,\gamma,\gamma$-tetramethylbutyl)-phenol and formaldehyde formed in the presence of oxalic acid, 41 parts of sodium isethionate, and one part of sodium hydroxide. This mixture was stirred and heated at 180°–185° C. for six hours and then at 200° C. for another six hours. The reaction mixture was protected with nitrogen and the water formed carried off in the stream of nitrogen gas. The product obtained was a hard, waxy solid, which formed soapy aqueous solutions which showed very good detergency under both hot and cold conditions.

By heating together an alkali isethionate and a compound, ROH, as defined above, in the presence of a small amount of alkali hydroxide with removal of water formed during the reaction, there are obtained sulfonated ethyl ethers. The process is peculiarly advantageous in using readily obtained reactants which are not corrosive. The products may be used as obtained or may be purified, if desired. The process has the further advantage that the products need not be contaminated with deleterious amounts of acids or salts. The products may be used as surface-active materials in aqueous or solvent systems, for cleaning, emulsifying, dispersing, wetting, and the like, and find application in diverse fields. They may find application in building maintenance, in household cleaning, in laundries, in textile applications as assistants, in flotation, in preparation of lubricating compositions, etc.

The process claimed here is directed to etherification of ether alcohols of the formula $$R''(OR')_xOH \text{ or } R''(OC_nH_{2n})_xOH$$

which boil above 155° C. and in which R'' is a hydrocarbon group of preferably not over eighteen carbon atoms. The comparable process involving compounds of the formula ROH, wherein R is a hydrocarbon group, is claimed in our copending application, Serial No. 728,957, filed on even date.

We claim:

1. The process for preparing diisobutylphenoxyethoxy-ethoxyethane sodium sulfonate which comprises reacting by heating together sodium isethionate and diisobutylphenoxyethoxyethanol at a temperature between 155° C. and 260° C. in the presence of sodium hydroxide as a catalyst with removal of water formed during the reaction.

2. A process for preparing the ether of sodium hydroxyethane sulfonate and an aryl aliphatic ether alcohol, $R''(OC_2H_4)_xOH$, wherein $C_2H_4$ represents an alkylene chain of two carbon atoms, $x$ is an integer from one to twenty, and R'' is an alkylphenyl group in which the alkyl group is tertiary and contains four to twelve carbon atoms, which comprises reacting sodium hydroxyethane sulfonate with said ether alcohol by heating at a temperature from 155° C. to 260° C. in the presence of sodium hydroxide as a catalyst with removal of water formed during the reaction.

3. A process for preparing the ether of an alkali metal hydroxyethane sulfonate and an aryl aliphatic ether alcohol, $R''(OC_nH_{2n})_xOH$, wherein $C_nH_{2n}$ represents an alkylene chain of two to three carbon atoms, $x$ is an integer from one to twenty, and R'' is an alkylphenyl group in which the alkyl group contains four to twelve carbon atoms, which comprises reacting an alkali metal hydroxyethane sulfonate with said ether alcohol by heating at a temperature from 155° C. to 260° C. in the presence of an alkali metal hydroxide as a catalyst with removal of water formed during the reaction.

4. A process for preparing the ether of an alkali metal hydroxyethane sulfonate and an ether alcohol which boils above 155° C. and which has the formula $R''(OR')_xOH$, wherein R' is an alkylene chain of two to three carbon atoms, $x$ is an integer from one to twenty, and R'' is a hydrocarbon group of not over eighteen carbon atoms, which comprises reacting an alkali metal hydroxyethane sulfonate and a said ether alcohol by heating at a temperature from 155° C. to 260° C. in the presence of an alkali metal hydroxide as catalyst with removal of water formed during the reaction.

CHARLES S. HOLLANDER.
LOUIS H. BOCK.

REFERENCES CITED

The following references are of record in the file of this patent:

UNITED STATES PATENTS

| Number | Name | Date |
|---|---|---|
| 1,733,721 | Carter | Oct. 29, 1929 |
| 1,985,747 | Steindorff et al. | Dec. 25, 1934 |
| 1,994,927 | Sibley | Mar. 19, 1935 |
| 2,110,847 | DeGroote | Mar. 8, 1938 |
| 2,143,759 | Bruson | Jan. 10, 1939 |
| 2,204,339 | Bowles | June 11, 1940 |
| 2,282,469 | Frolich | May 12, 1942 |
| 2,399,434 | Graenacher | Apr. 30, 1946 |
| 2,427,577 | Smith | Sept. 16, 1947 |
| 2,480,859 | Hollander | Sept. 6, 1949 |